(12) United States Patent
Alexander et al.

(10) Patent No.: US 8,247,731 B2
(45) Date of Patent: Aug. 21, 2012

(54) LASER SCRIBING AND MACHINING OF MATERIALS

(75) Inventors: Dennis R. Alexander, Lincoln, NE (US); John Bruce, III, Lincoln, NE (US)

(73) Assignee: Board of Regents of the University of Nebraska, Lincoln, NE (US)

( * ) Notice: Subject to any disclaimer, the term of this patent is extended or adjusted under 35 U.S.C. 154(b) by 1030 days.

(21) Appl. No.: 12/165,074

(22) Filed: Jun. 30, 2008

(65) Prior Publication Data

US 2008/0296263 A1 Dec. 4, 2008

Related U.S. Application Data

(63) Continuation-in-part of application No. 10/969,167, filed on Oct. 20, 2004, now abandoned, which is a continuation-in-part of application No. 10/347,533, filed on Jan. 21, 2003, now Pat. No. 6,864,457.

(60) Provisional application No. 60/359,133, filed on Feb. 25, 2002, provisional application No. 60/370,892, filed on Apr. 8, 2002.

(51) Int. Cl.
*B23K 26/00* (2006.01)
(52) U.S. Cl. ............ 219/121.6; 219/121.76; 219/121.77
(58) Field of Classification Search ................ 219/121.6, 219/121.76, 121.77
See application file for complete search history.

(56) References Cited

U.S. PATENT DOCUMENTS

| | | | |
|---|---|---|---|
| 5,656,186 A | 8/1997 | Mourou et al. | |
| 5,761,111 A | 6/1998 | Glezer | |
| 5,787,102 A | 7/1998 | Alexander et al. | |
| 5,862,845 A | 1/1999 | Chin et al. | |
| 5,950,071 A | 9/1999 | Hammond et al. | |
| 6,175,096 B1 * | 1/2001 | Nielsen | 219/121.72 |
| 6,180,915 B1 | 1/2001 | Sugioka et al. | |
| 6,285,002 B1 | 9/2001 | Ngoi et al. | |
| 6,313,461 B1 | 11/2001 | McClelland et al. | |
| 6,337,479 B1 | 1/2002 | Kley | |
| 6,555,784 B2 * | 4/2003 | Iehisa et al. | 219/121.76 |
| 6,563,082 B2 * | 5/2003 | Terada et al. | 219/121.72 |
| 2005/0006361 A1 * | 1/2005 | Kobayashi et al. | 219/121.73 |
| 2005/0098548 A1 * | 5/2005 | Kobayashi et al. | 219/121.73 |

OTHER PUBLICATIONS

Von Der Lind et al., "Breakdown Threshold and Plasma Formation in Femtosecond Laser-Solid Interaction", Journal of the Optical Society of America B., Opt. Phys. vol. 13, No. 1 (Jan. 1996).
Liu et al., "Laser Ablation and Micromachining with Ultrashort Laser Pulses", IEEE Journal of Quantum Electronics, vol. 33, No. 10 (Oct. 1997).
Kauter, et al., "Femtosecond-Pulse Laser Microstructuring of Semiconductor Materials", Materials Science Forum 173-174 (1995).
Momma et al., "Short-Pulse Laser Ablation of Solid Targets", Optics Communications 129 (1996).
Zhu, et al., "Experimental Study of Drilling Sub-10 pm Holes in Thin Metal Foils With Femtosecond Laser Pulses", Applied Surface Science 152 (1999).

(Continued)

*Primary Examiner* — M. Alexandra Elve
(74) *Attorney, Agent, or Firm* — Thompson Coburn LLP

(57) ABSTRACT

Disclosed are systems and methods for directing laser energy to surfaces of materials via elements which have sharp points, and for reducing the adverse effects of particles which become dislodged by scribing and laser machining of materials.

8 Claims, 11 Drawing Sheets

OTHER PUBLICATIONS

Pronko et al., "Machining of Sub-Micron Holes Using a Femtosecond Laser at 800 nm", Optics Communications 114 (1995).
Simon et al., "Ablation of Submicron Structures on Metals and Semiconductors by Femtosecond UV-Laser Pulses", Applied Surface Science 109-110 (1997).
Max et al., "Self-Modulation and Self-Focusing of Electromagnetic Waves in Plasmas", Physical Review Letters vol. 33, No. 4 (Jul. 1974).
Borisov et al., "Relativistic and Charge-Displacement Self-Channeling of Intense Ultrashort Laser Pulses in Plasmas", The American Physical Society, Physical Review A. 45(8) (Apr. 1992).
Gibbon et al., "Measurable Signatures of Relativistic Self-Focusing in Underdense Plasma", American Institute of Physics, Phys. Plasmas, 2(4) (Apr. 1995).
Fuchs et al., "Dynamics of Subpicosecond Relativistic Laser Pulse Self-Channeling in an Underdense Preformed Plasma", The American Physical Society, Physical Review Letters, vol. 80, No. 8 (Feb. 1998).
Chen et al., "Evolution of a Plasma Waveguide Created During Relativistic-Ponderomotive Self-Channeling of an Intense Laser Pulse", The American Physical Society, Physical Review Letters, vol. 80, No. 12 (Mar. 1998).
Mourou et al., "Relativistic Nonlinear Optics the Second Wind of Nonlinear Optics", Ultrashort Laser Workshop for DOD Applications, MSF-Center for Ultrafast Optical Science University of Michigan (Mar. 2000).
Her et al., "Microstructuring of Silicon with Femtosecond Laser Pulses", American Institute of Physics, Applied Physics Letters, vol. 73, No. 12 (Sep. 1998).
"Surface Plasmon Resonance Overview", www.memorialventures.com.
"STM Tutorial", www.chembio.uoguelph.ca.edumat/chm729/STMpage/stmconc.htm.

* cited by examiner

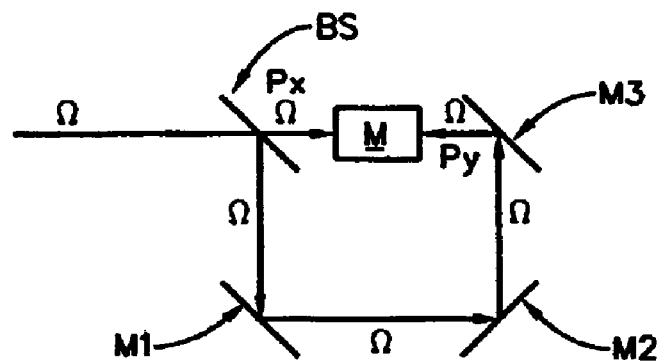
FIG. 2b
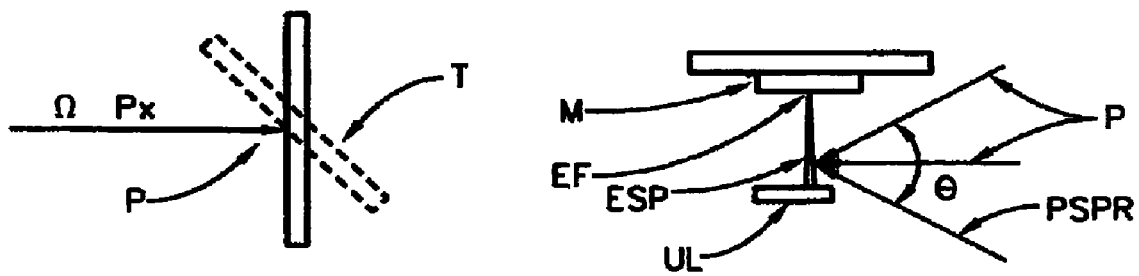
FIG. 4
FIG. 3
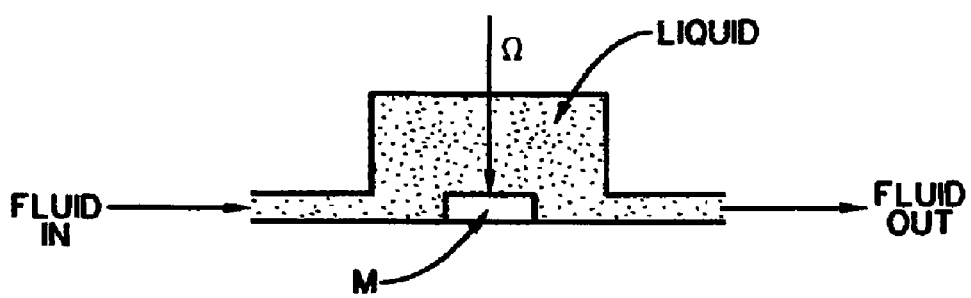
FIG. 5

LASER SCRIBING AND MACHINING OF MATERIALS

CROSS-REFERENCE TO RELATED APPLICATIONS

This application is a continuation-in-part (CIP) of pending application Ser. No. 10/969,167 filed Oct. 20, 2004, which is a CIP of application Ser. No. 10/347,533 filed Jan. 21, 2003, now U.S. Pat. No. 6,864,457, which claims the benefit of Provisional Application No. 60/359,133 filed Feb. 25, 2002, and Provisional Application No. 60/370,892 filed Apr. 8, 2002.

STATEMENT REGARDING FEDERALLY SPONSORED RESEARCH OR DEVELOPMENT

Not applicable.

TECHNICAL FIELD

The disclosed invention relates to laser scribing and machining of materials, and more particularly to systems and methods for improving precision of laser scribing and machining of materials and decreasing the adverse affects of dislodged particles which can accumulate on processed material surfaces.

BACKGROUND

Pending application Ser. No. 10/969,167 filed May 26, 2005, from which this application is a CIP and pending application Ser. No. 10/347,533 filed Jan. 21, 2003, from which this application is a CIP teaches scribing and machining of materials using laser beams which directly interact with said material. The novel point in the 533 application is application of the laser beam from beneath the material being scribed or machined because gravity then aids with disposing of dislodged particles. The present invention can be practiced in a similar manner, but is not necessarily limited thereto.

The first known creation of two micron diameter or less, high aspect ratio, (eg. Depth/Diameter greater than 7.0), holes was achieved using femto second laser pulses. Further the usefulness of said holes is only recently being explored, particularly by the semiconductor industry as it strives to achieve ever smaller size and lower operating power devices.

The machining of materials using laser beams is known. For instance a U.S. Pat. No. 5,656,186 to Mourou et al, describes the use of laser pulses which are characterized by having a pulse width equal to or less than a characteristic value, and focusing said laser pulses on or below the surface of a material. The characteristic pulse width is determined by noting a rapid and distinct change in slope of fluence breakdown threshold vs. laser pulse width. U.S. Pat. No. 6,285,002 to Ngoi et al. describes a three-dimensional micro-machining system comprising application of spatial filter to fashion laser pulses. U.S. Pat. No. 5,787,102 to Alexander et al. describes use of a periodically structured non-linear material to generate second harmonics in a laser system. U.S. Pat. No. 5,761,111 to Glezer describes application of ultrashort laser pulses in forming 2D and 3D optical information storage in transparent materials. U.S. Pat. No. 6,313,461 to McClelland et al. describes detection of photoelectrons ejected from the surface of a material being machined to image magnetic and/or spectroscopic features of the surface of a sample. A U.S. Pat. No. 5,862,845 to Chin et al., describes use of an ultrafast intense laser for processing lignocellulosic materials. Use of pulses of less than 10-9 sec. and having peak intensity of at least $10^{11}$ w/cm$^2$ is described. In the context of the presently disclosed invention, a very relevant is U.S. Pat. No. 6,337,479 to Kely. Said '479 patent describes the use of a scanning probe microscope probe to sweep away debris particles on a materials surface cause by laser machining thereof. The Kley '479 patent is particularly relevant as it identifies the problem caused by particles which become dislodged and accumulate on a material's surface during laser-machining thereof by use of laser pulses caused to impinge thereupon.

Patents identified by the Examiner in prosecution of the Parent 553 application to this CIP are:
Published patent application No. U.S.-2002/0167581 by Cordingly et al.;
Published patent application No. U.S.-2002/0162973 by Cordingly et al.;
Published patent application No. U.S.-2002/0166845 by Cordingly et al.;
U.S. Pat. No. 6,246,025 to Scott;
U.S. Pat. No. 6,420,674 to Cole et al.;
U.S. Pat. No. 6,692,337 to Jennings et al.;
U.S. Pat. No. 5,359,176 to Balliet et al.;
U.S. Pat. No. 4,784,491 by Penney et al.;
U.S. Pat. No. 4,347,785 to Chase et al.;
U.S. Pat. No. 4,131,484 to Caruso et al.;
U.S. Pat. No. 6,204,475 to Nakata et al.;
U.S. Pat. No. 5,916,460 to Imoto et al.

Another patent, U.S. Pat. No. 6,180,915 to Sugioka et al. is identified as it was discovered in a Search for Patents that combine Scanning Force and Atomic Force Microscropes with Laser Machining of Materials. Also provided is a Tutorial on titled "STM Concept" by Tit-Wah-Hui, which was identified using Google. The reason for identifying said references is because the present invention can be practiced using Scanning Force and Atomic Force Microscropes which comprise a sharp point element. Further disclosed is a brief description titled "Surface Plasmon Resonance Overview". This is provided as the present invention can involve operation in a (SPR) mode.

Relevant Scientific Articles Include:
"Breakdown Threshold and Plasma Formation in Femtosecond Laser-Solid Interaction", Linde and Schyler, J. of the Opt. Soc. of America B., Opt. Phys. 13(1), (1996);
"Laser Ablation and Micromachining with Ultrashort Laser Pulses", Lie et al., IEEE J. of Quantum Electronic 33(10) (1997);
"Femtosecond-Pulse Laser Microstructuring of Semiconductor Materials", Kautek et al., Mat. Science Forum 173, (1995);
"Short-Pulse Laser Ablation of Solid Targets", Momma et al., Optics Comm. 129, (1996);
"Experimental Study of Drilling Sub-10 n Holes in Thin Metal Foils With Femtosecond Laser Pulses", Zhu et al., Appl. Surf. Sci. 152, (1999);
"Machining of Sub-Micron Holes Using a Femtosecond Laser at 800 nm", Pronko et al., Optics Comm. 114, (1995);
"Ablation of Submicron Structures on Metals and Semiconductors by Femtosecond uv-Laser Pulse", Simon et al., Appl. Surf. Sci. 109-110, (1997);
"Self-Modulation and Self-Focusing of Electromagentic Waves in Plasmas", Max et al., Phys. Rev. Letters 33(4), (1974;
"Self-Modulation and Self-Focusing of Electromagentic Waves in Plasma", Borisov et al., Physical Rev. A 45(8), (1992);

"Measurable Signatures of Self-Focusing in Underdense Plasma", Gibbon et al., Phys. of Plasma, 2(4), (1995);

"Dynamics of Subpicosecond Relativistic Laser Pulse Self-Channeling in an Underdense Preformed Plasma", Phys. Rev. Lett., 80(8), (1998);

"Evolution of a Plasma Waveguide Created During Relativistic-Ponderomotive Self-Channeling of an Intense Laser Pulse", Chen et al., Phys. Rev. Let. 80(12), (1998);

"Relativistic Nonlinear Optics the Second Wind of Nonlinear Optics", Mourou et al., Ultrashort Laser Workshop for DOD Applications, NSF-Center for Ultrafast Optical Science University of Michigan, (March 2000);

"Breakdown Threshold and Plasma Formation in Femtosecond Laser-Solid Interaction", Linde et al., J. of the Opt. Soc. of America B., Opt. Phys. 13(1), (1996);

"Microstructuring of Silicon with Femtosecond Laser Pulses", Her et al., Appl. Phys. Lett. 73(12), (1998).

DISCLOSURE OF THE INVENTION

The invention disclosed in Allowed Parent application Ser. No. 10/347,533 comprises system and method means for directly applying laser beam pulses to materials for the purpose of effecting scribing or machining thereof. The present invention modifies said teachings to provide that the laser beam is applied to an element comprising a sharp point, which sharp point is caused to be in very close proximity to, or in contact with, the material. Use of said sharp point to deliver scribing or machining energy to the material surface enables five (5) Nanometer dimensions to be achieved. It is noted that said sharp point can be an element of a Scanning Probe or an Atomic Force Microscope, or can be an independent element, and serves as a via to more precisely present laser provided energy to a specific location on said material.

An underlying principal of operation of the presently disclosed invention is that applying a laser beam to an element causes electrons to become free therewithin, and accumulation of said electrons in a sharp point thereof creates a highly localized strong electric field adjacent to the material. The effect of the strong electric field is the scribing or machining of said material.

A special case of the present invention provides that the laser beam electromagnetic radiation be P-polarized (with respect to a surface of the element), and that the trajectory of said laser beam lead it to approach said surface of the element along an angle of incidence thereto appropriate for creating a Surface Plasmon, thereby causing the laser beam electromagnetic radiation to travel along the surface of the element toward the sharp point. This aspect of the present invention can be practiced where the sharp point is oriented to project upward, downward or at any angle inbetween. However, a preferred embodiment of the presently disclosed invention continues the theme of the 533 application, which provides that the laser beam approach the material from beneath, along an upward oriented trajectory.

Continuing, for general insight, it is noted that the Parent Application disclosed system and method means for reducing the adverse effects of dislodged particles during laser machining of materials, embodiments of which comprise selection(s) from six primary components:

directing laser pulses to approach a material surface from beneath, along a generally upward vertical locus so that gravity causes dislodged particles to fall away;

directing laser pulses to approach a material surface along a locus between upward vertical upward from beneath, and horizontal, inclusive, so that gravity causes dislodged particles to fall away;

directing laser pulses to approach a material surface along a locus which passes through a fluid;

causing laser pulses to be split into first and second laser beams, the first laser beam thereof being directed to approach a first surface of a material which comprises two surfaces, and the second laser beam being substantially simultaneously directed to approach a second surface, or a different location on the first surface of said material which comprises two surfaces;

formation of a series of laser pulses by splitting a laser pulse into two such laser pulses, entering a time delay into one thereof and then recombining the two pulses into a sequence of two laser pulses.

use of electrons developed by interaction of laser pulses with a material to effect real time observation and optionally control of machining results.

While many laser pulse producing systems can be applied in practice of the disclosed invention, preferred laser pulses are fashioned from a Femtosecond Oscillator and a Regenerative Chirped Pulse Amplifier of 795 nm wavelength, (possibly frequency doubled to 400 nm), and repeated at 996 Hz, with a final output level being set with a half wave-plate CVI part QWPO-800-05-2-R10, and a Glans laser Polarizer part 03PGL303. Beam direction can be provided by dichroic mirrors, CVI Part No. TLMI-800.0-1037, with focusing provided by an Optics For Research Part No. LMU-15x-NUV objective. As the Focusing Lens is optimized at around 400 nm, Power Readings are typically taken there-before with a Newport Power Meter Model 835 and thereafter with Newport Power Meter Model 1815-C. Where a gas fluid flow, (e.g. compressed nitrogen, or an Air Dimension Model 01310TCQ Vacuum Pump can be used to create a Gas flow or Vacuum Stream), is utilized to sweep away dislodged particles, a nozzle constructed from a short length of stainless steel tubing, with an aperture opening of 7.35 nm by 0.64 nm can be utilized to provide the gas flow, and a Cole-Parmer FM044-40 flow rate monitor can be applied to monitor the flow.

A preferred embodiment of a presently disclosed invention is a method of performing a selection from the group consisting of:

laser scribing; and laser-machining;

materials comprising the steps of:

providing a laser pulse producing means and a material, a surface of which is to be laser scribed or machined;

providing an element comprising a sharp point which is positioned in close proximity to, or in contact with, said surface;

orienting said laser pulse producing means such that laser pulses produced by said laser pulse producing means are caused to impinge upon said element which comprises a sharp point.

such that electrons in said element comprising a sharp point are freed therewithin, with the result being that an electric field is created between said sharp point and said surface of said material which is to be scribed or machined thereby causing scribing or machining thereof.

The sharp point of said element comprising a sharp point can be oriented to point generally upward and the surface of said material to be scribed or machined face generally downward, such that particles dislodged by the application of said laser pulses to said element comprising a sharp point are caused to fall away therefrom under the influence of gravity.

The surface of the material to be scribed or machined can be oriented face essentially horizontally, and said sharp point of said element comprising a sharp point oriented to point essentially horizontally toward said surface, such that particles dislodged by the application of said laser pulses to said element comprising a sharp point are caused to fall away therefrom under the influence of gravity.

The surface of said material to be scribed or machined can be oriented to face generally upward, and said sharp point of said element comprising a sharp point oriented to point generally downward toward said surface.

The surface of said material to be scribed or machined and said sharp point of said element comprising a sharp point can be contained within a fluid and the laser pulses approach said element comprising a sharp point therethrough. The fluid can be liquid, such as at least one a selection from the group consisting from:
water;
acetone;
methonal;
ethanol; and
trichloroethylyne.

Another method of performing a selection from the group consisting of:
laser scribing; and
laser-machining;
of at least one surface of a material, comprising the steps of:
providing a laser pulse producing means and a material, at least one surface of which is to be laser scribed or machined;
providing at least one element comprising a sharp point which is positioned in close proximity to, or in contact with, said at least one surface;
providing a beam splitter and beam directing means such that a laser pulse entering thereinto exits therefrom as two pulses, at least one of which can be directed by said beam directing means to impinge on said at least one element comprising a sharp point;
orienting said laser pulse producing means and material such that laser pulses produced by said laser pulse producing means are caused to pass through said beam splitter, with the resulting two pulses being directed in a manner such that at least one of said pluses impinges upon said at least one element comprising a sharp point; and
optionally directing the second of said pulses to affect a second surface of said material.

Present Invention Methodology can Involve:
the laser pulses produced by said laser pulse producing means being caused to impinge upon a surface of said element which comprises a sharp point P-polarized with respect to said surface, and at an angle-of-incidence thereto such that a surface plasmon is formed.

providing laser pulse producing means which further comprises means for formation of a series of laser pulses by splitting a laser pulse into two such laser pulses, entering a time delay into one thereof and then recombining the two pulses into a sequence of two laser pulses.

providing the element comprising a sharp point which is in a scanning probe or atomic force microscope probe.

using electrons developed by interaction of laser pulses with a material are utilized to effect real time observation and optionally control of said laser-machining results.

using laser pulses which are femto-second or shorter in duration.

using laser pulses are femto second or longer;
causing said laser pulses to approach the element comprising a sharp point via at least one selection from the group consisting of:
reflective mirror means;
at least one lens; and
an aperture plate;

directing the laser through a liquid selected from the group consisting from:
water;
acetone;
methonal;
ethanol; and
trichloroethylyne.

It is further disclosed that said element comprising a sharp point can be subjected to ultrasonic vibration excitation to dislodge particles which result from scribing or machining of said material and otherwise accumulate thereupon.

Material Previously Disclosed in Parent application Ser. No. 10/347,533.

The following material was disclosed in the Parent application Ser. No. 10/347,533 is again presented for background and insight.

A disclosed system for laser-machining materials comprises:
a femto second or shorter laser pulse producing means;
said femto second or shorter laser pulse producing means being oriented in said system such that laser pulses produced thereby are caused to approach the surface of said material from therebeneath;
such that in use particles dislodged by the application of said femto second or shorter laser pulses to said downward facing surface of said material are caused to fall away from the surface of said material under the influence of gravity. Said laser pulses can be caused to approach the surface of said material from therebeneath via selections from the group:
reflective mirror means;
at least one lens; and
an aperture plate;
such that the femto second or shorter laser pulse producing means provides laser pulses to the surface of the material by way of reflection from said reflective mirror means, and wherein said at least one lens serves to focus the pulses through said aperture plate and toward said material surface; the aperture plate, when present, being situated above said reflective mirror means and below said downward facing surface of said material so as to intercept dislodged particles and prevent their accumulation on said reflective mirror means.

Another disclosed system for producing a sequence of laser pulses comprises:
femto second or shorter laser pulse producing means;
beam splitter means;
first reflective mirror means;
time delay entry means;
second reflective mirror means; and
beam combiner means;
such that laser pulses produced by said femto second or shorter laser pulse producing means are caused to impinge on said beam splitter with approximately half thereof passing directly to said beam combiner means, and with the remaining approximately half thereof being caused to interact with, in any functional order, said first reflective mirror means, time delay entry means, and second reflective mirror means before passing to said beam combiner; there emerging from said beam combiner, for each laser pulse entered to the beam splitter, a sequence of pulses offset in time from one another.

Another disclosed system for laser-machining materials comprises:
a femto second or shorter laser pulse producing means, said system further comprising means therewithin to direct laser pulses onto a material surface which is oriented to face between vertically downward and horizontally, along a locus which is oriented between vertically upward and horizontal, inclusive of vertical and horizontal; such that in use particles dislodged by the application of said laser pulses to said surface of said material are caused to fall away from the surface of said material under the influence of gravity.

Another disclosed system for laser-machining materials is comprised of:
 a femto second or shorter laser pulse producing means;
 beam splitter;
 first reflective mirror means;
 second reflective mirror means; and
 optionally additional reflective mirror means;
 oriented such that laser pulses provided by the femto second or shorter laser pulse producing means are caused to enter said beam splitter, with approximately half of each laser pulse passing directly through said beam splitter and impinging on a surface of said material, and with the remaining approximately half of each laser pulse proceeding to interact with said second and optionally additional reflective mirror means and then impinge on the same or another surface of said material.

Another disclosed system for laser-machining materials comprises:
 a femto second or shorter laser pulse producing means in functional combination with means for submerging the surface of a material, which surface is to be machined, in a fluid;
 said laser pulse producing means being oriented in said system such that laser pulses produced by said laser pulse producing means are caused to approach the surface of said material by said system, along a locus which passes through said fluid;
 such that in use particles dislodged by the application of said laser pulses to said surface of said material are caused to be entered to said fluid. Said system laser pulse producing means can be, but are not necessarily, situated vertically above the material surface.

A disclosed method of laser-machining materials then comprises the steps of:
 providing a laser pulse producing means and a material, the surface of which is to be machined;
 orienting said laser pulse producing means and material such that laser pulses produced by said laser pulse producing means are caused to approach the surface of said material from therebeneath;
 such that particles dislodged by the application of said laser A modified disclosed method of laser-machining materials comprising the steps of:
 providing a laser pulse producing means and a material, the surface of which is to be machined;
 orienting said laser pulse producing means and material such that laser pulses produced by said laser pulse producing means are caused to approach a substantially vertically oriented surface of said material, along a substantially horizontally oriented locus; such that particles dislodged by the application of said laser pulses to said surface of said material are caused to fall away from the surface of said material under the influence of gravity.

Another modified method of laser-machining materials comprising the steps of:
 providing a laser pulse producing means and a material, the surface of which is to be machined;
 orienting said laser pulse producing means and material such that laser pulses produced by said laser pulse producing means are caused to approach a surface of said material which is oriented to face between vertically downward and horizontally, along a locus which is oriented between vertically upward and horizontally;
 such that particles dislodged by the application of said laser pulses to said surface of said material are caused to fall away from the surface of said material under the influence of gravity.

Another modified disclosed method of laser-machining materials comprising the steps of:
 providing a laser pulse producing means and a material, the surface of which is to be machined;
 providing a fluid containing means and placing said material thereinto;
 orienting said laser pulse producing means and material which is placed into said fluid containing means such that laser pulses produced by said laser pulse producing means are caused to approach the surface of said material along a locus which passes through said fluid;
 such that particles dislodged by the application of said laser pulses to said surface of said material are caused to be removed from the surface of said material into said fluid. It has been found that flow of the fluid is not absolutely necessary to effect dispersal of dislodged particles, and the fluid can be any functional fluid, with examples being gas, or fluid, (eg. acetone, methyl or ethyl alcohol or trichlorethelyne etc.).

Another modified disclosed method of laser-machining materials comprising the steps of:
 providing a laser pulse producing means and a material, which is to be machined;
 providing a beam splitter and beam directing means such that a laser pulse entering thereinto exits therefrom as two pulses, each of which can be directed by said beam directing means to interact with said material;
 orienting said laser pulse producing means and material such that laser pulses produced by said laser pulse producing means are caused to pass through said beam splitter, with the resulting two pulses being directed in a manner characterized by a selection from the group consisting of:
  to interact with different surfaces of said material; and
  to interact with a surface of said material at different locations thereupon.

It is further disclosed that electrons developed by interaction of laser pulses with a material can be utilized to effect real time observation and optionally control of said laser-machining results.

The presently disclosed invention Laser Pulses are preferably femto or atto second in length, but pulses as long as nano-second pulses can, in some circumstances, beneficially be utilized It should be apparent that the various disclosed systems can be applied in practice of the various disclosed method sequences.

While not limiting, it is noted that the presently disclosed invention is particularly well suited for the machining of diamond and other semiconductors.

It is also to be understood that while "scribing" of a material typically involves other than laser ablation of holes into and/or lines through a material etc, the laser scribing of a material, such as a semiconductor substrate to facilitate separating individual devices fabricated therein, is to be considered as machining of said material. The use of both terms "scribing" and "machining" at some points in this Disclosure is to call attention to various applications to which the disclosed invention can be adapted without escaping the scope of the Claims.

The presently disclosed invention will be better understood by reference to the Detailed Description Section of this Specification, in conjunction with the Drawings.

to be machined by Laser Pulses is oriented to face downward so that dislodged particles fall away under gravity.

Figure 2A:
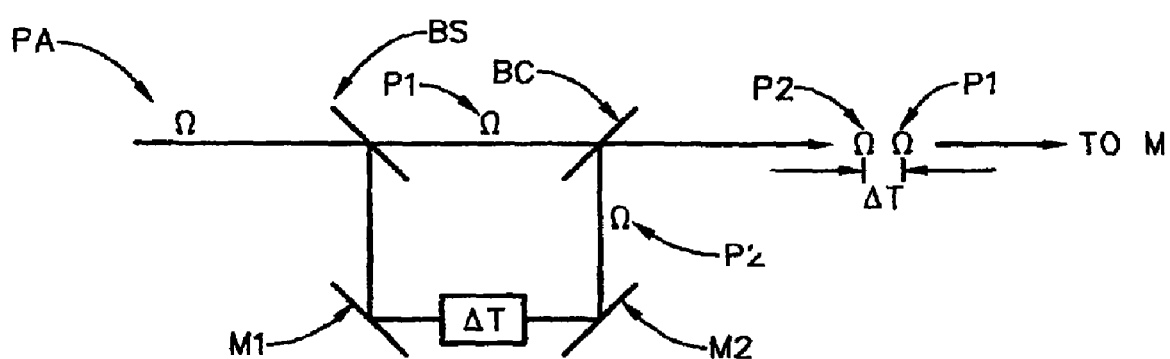

FIG. 2a demonstrates a system for producing a sequence of two Laser Pulses which is useful in practicing the disclosed invention.

FIG. 2b shows a system for presenting Laser Pulses to different sides of a Material.

FIG. 3 shows a system for applying laser beam energy to a energy to a surface of a material to be scribed or machined via an element which has a sharp point which is in close proximity to or in contact with said surface of said material.

FIG. 4 indicates that the presently disclosed invention can provide that a single Laser Pulse can be applied to a substantially vertically oriented Material Surface so that dislodged particles fall away under gravity.

FIG. 5 is included to indicate that an upwardly facing surface of a Material can be subjected to Laser Pulses through a fluid.

Figure 6:
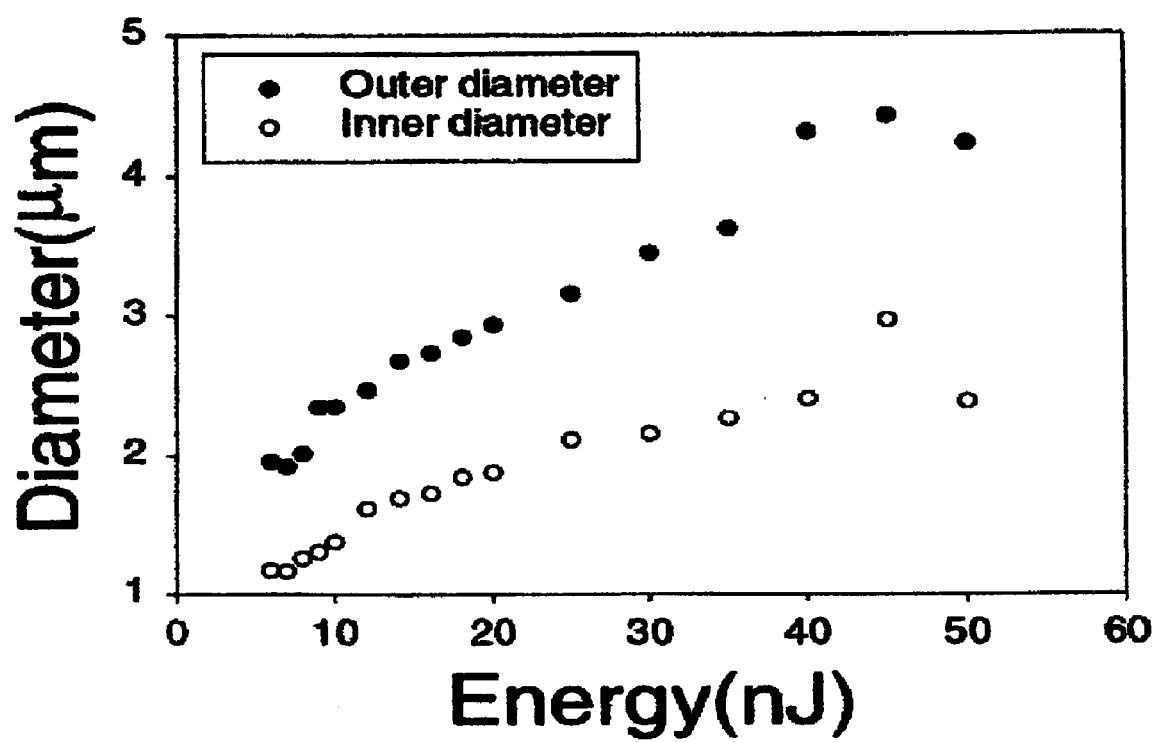

FIG. 6 shows a plot of Diameter vs. Energy(nJ) of laser pulse effected holes in P-type (111) Silicon with a Festivity of 8 m-ohm-cm.

Figure 7:
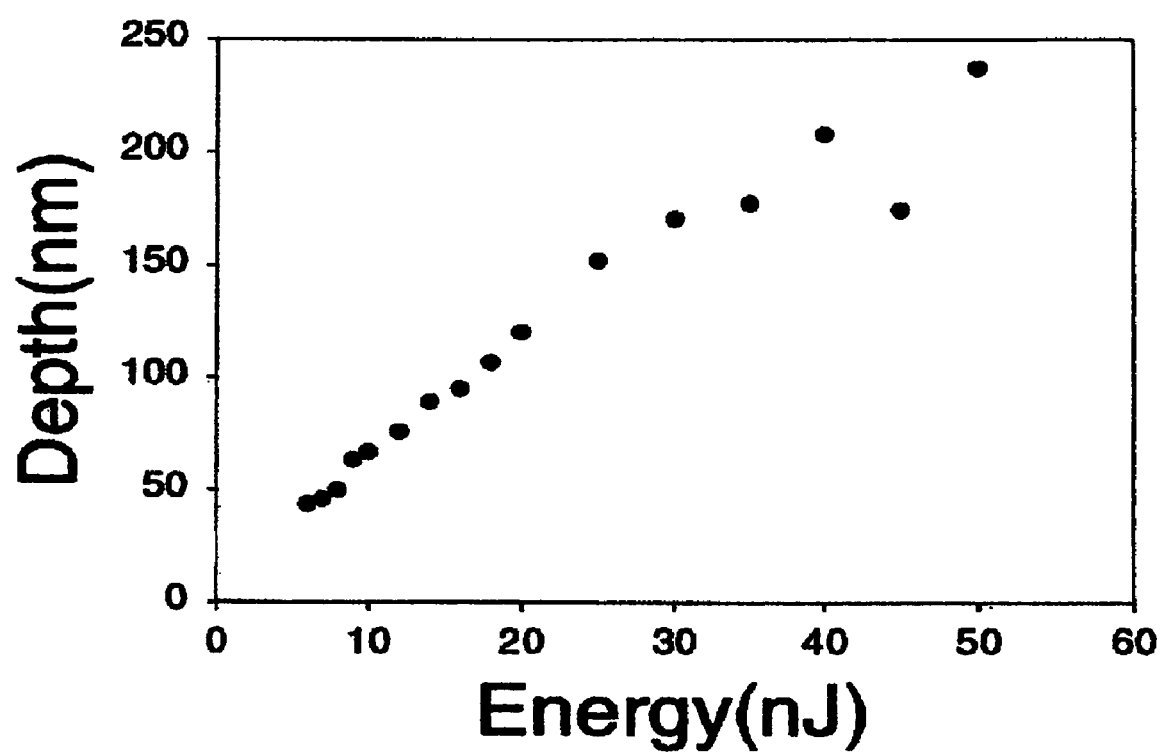

FIG. 7 shows a plot of Depth vs. Energy(nJ) of laser pulse effected holes in P-type (111) Silicon with a Festivity of 8 m-ohm-cm.

Figure 8:
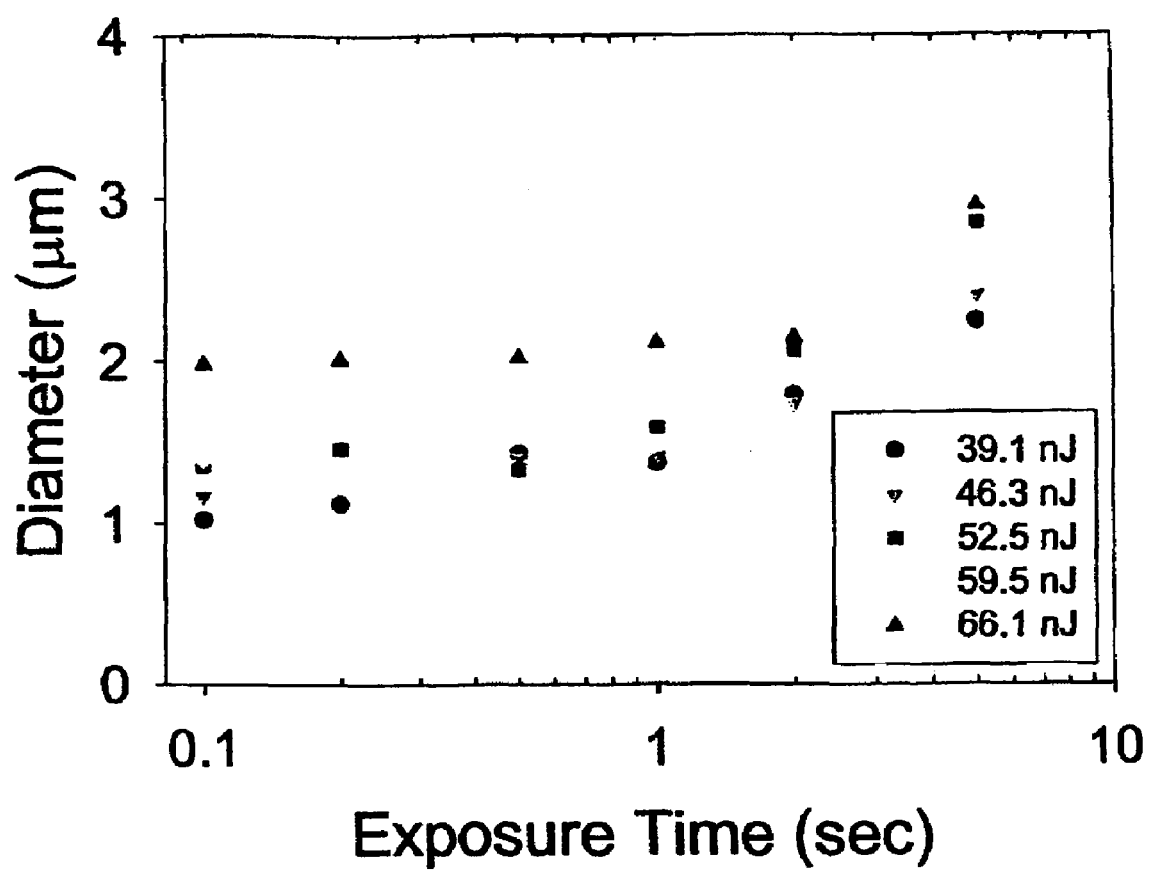

FIG. 8 shows damage diameters for various laser energies and exposure times.

Figure 9A:
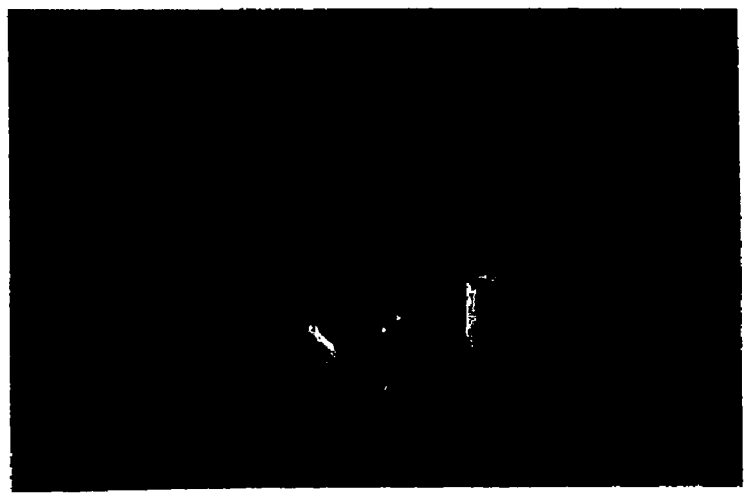
Figure 9B:

FIGS. 9a and 9b show SEM photos of holes created in (100) P-type Silicon with 8 m-ohm-cm resistivity by 0.1 second exposure to laser pulses, without and with application of a gas jet, respectively. Note the sharper edge in FIG. 9b.

Figure 10:
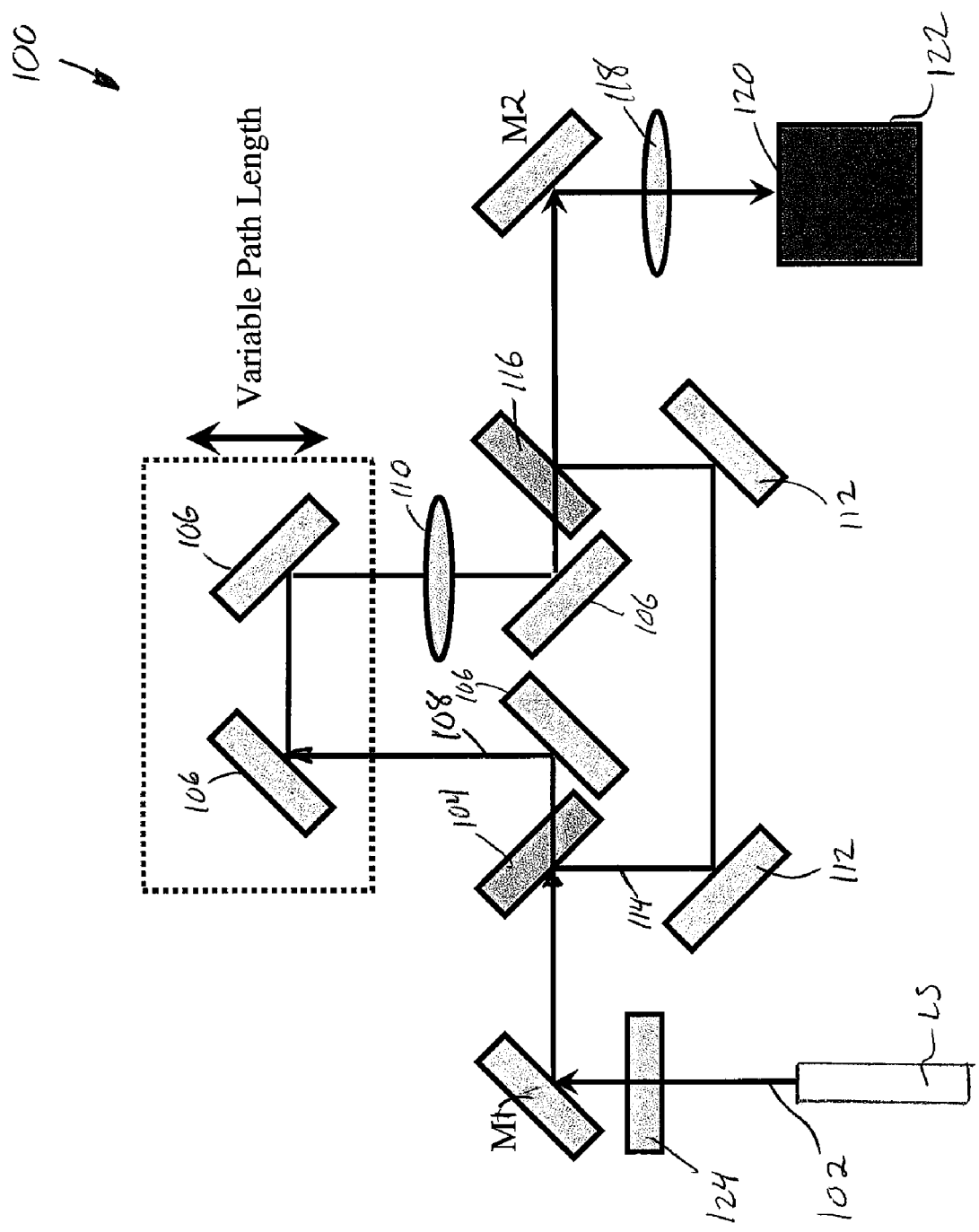

FIG. 10 depicts a system useful in practice of an embodiment of the disclosed invention in which laser pulses are split into two beams prior to contacting a desired surface for machining.

Figure 11:
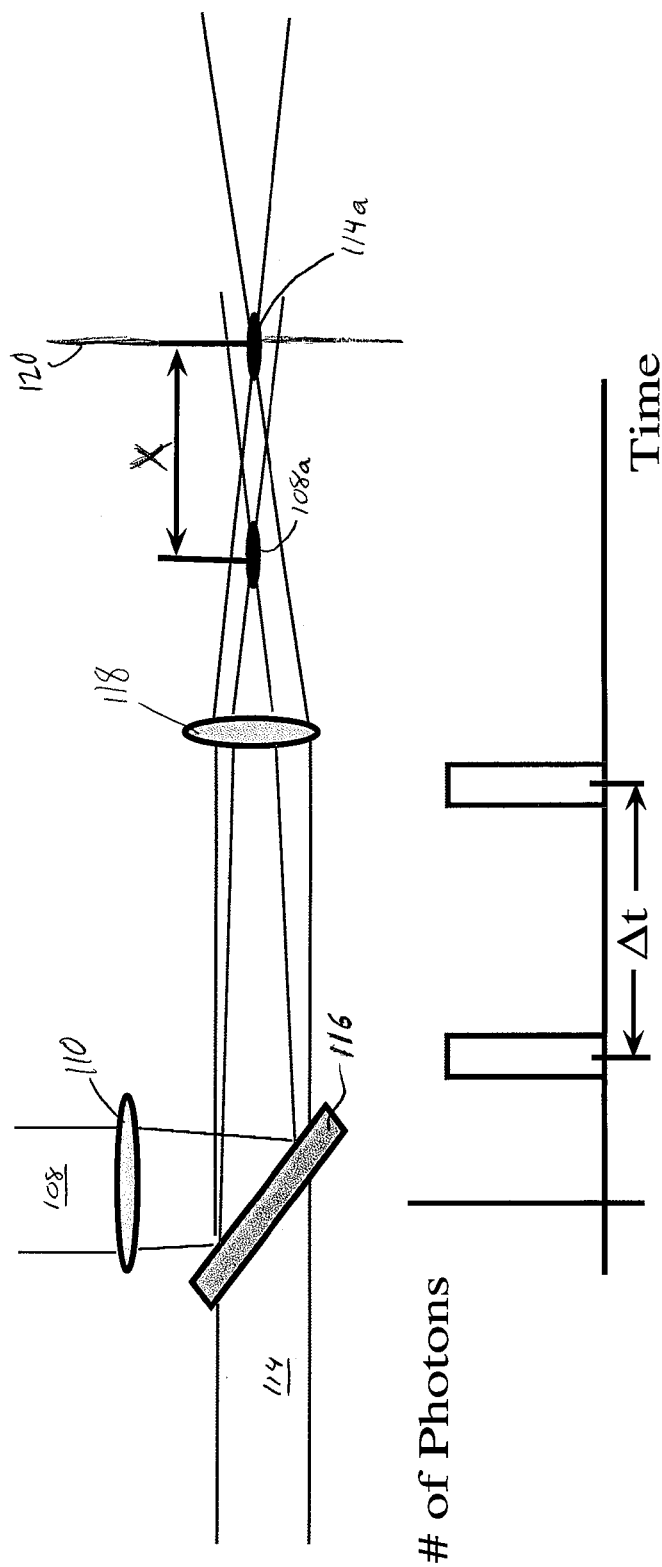

FIG. 11a depicts a portion of the system of FIG. 10 and includes projections of a first and second laser beam.

FIG. 11b depicts a chart showing a time delay between the first and second laser beams, the time delay associated with the system of FIG. 10.

Figure 12:
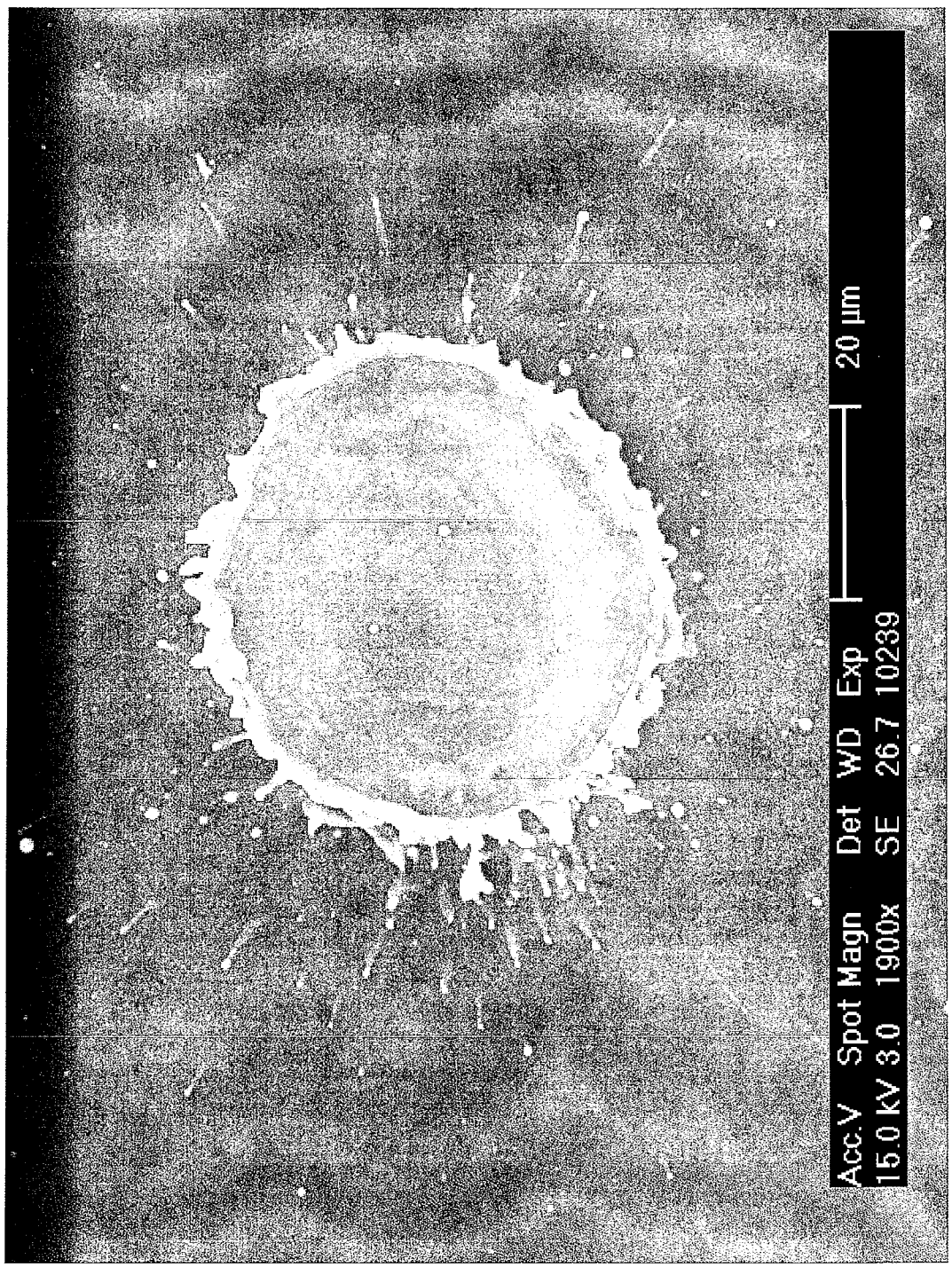

FIG. 12 shows a SEM photo of a hole and splatter created in Si by a single pulse laser.

Figure 13:
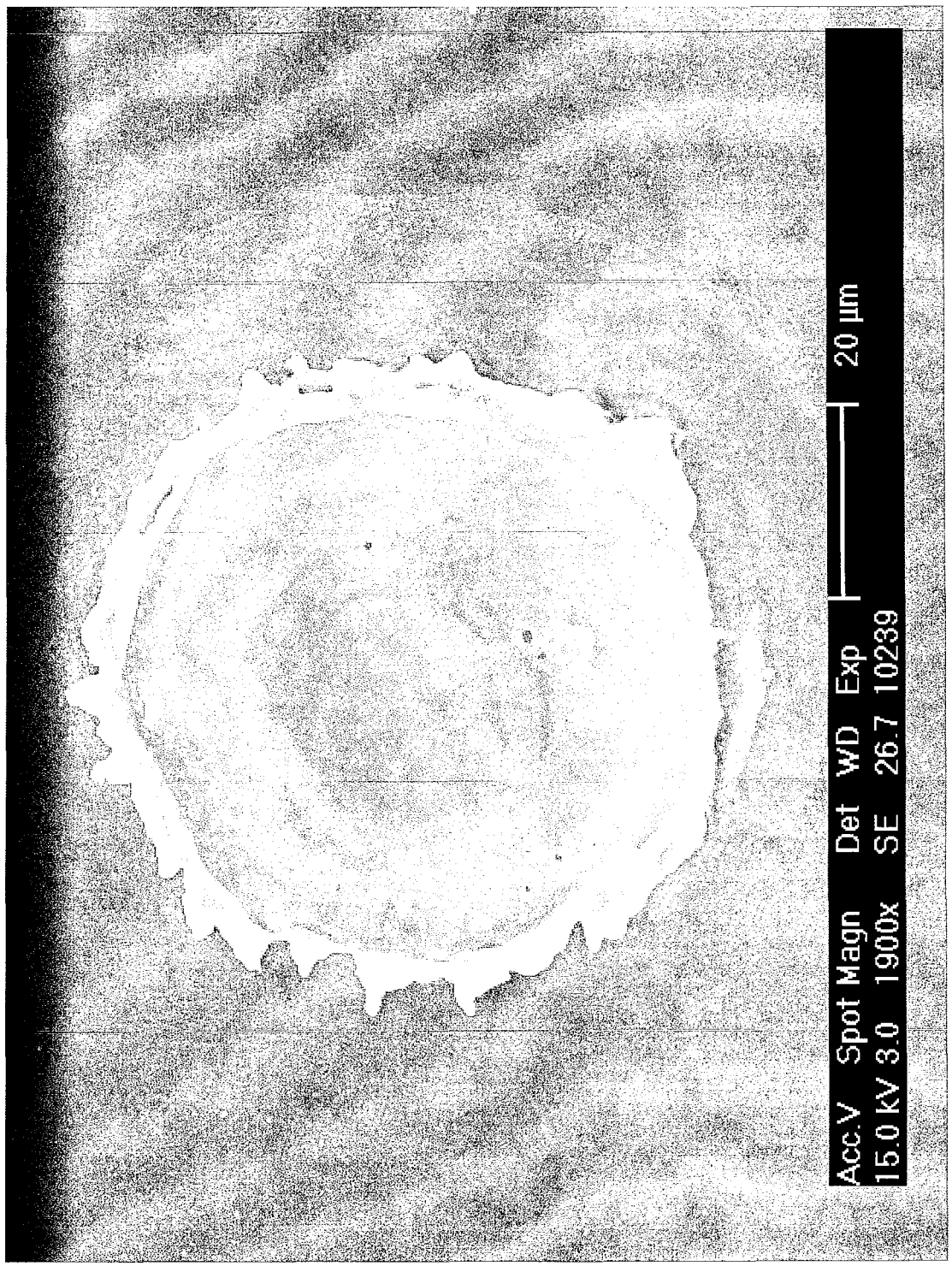

FIG. 13 shows a SEM photo of a hole pattern created in Si by a dual pulse, dual focus laser with a 3.7 ns inter-pulse delay.

Figure 14B:
Figure 14A:
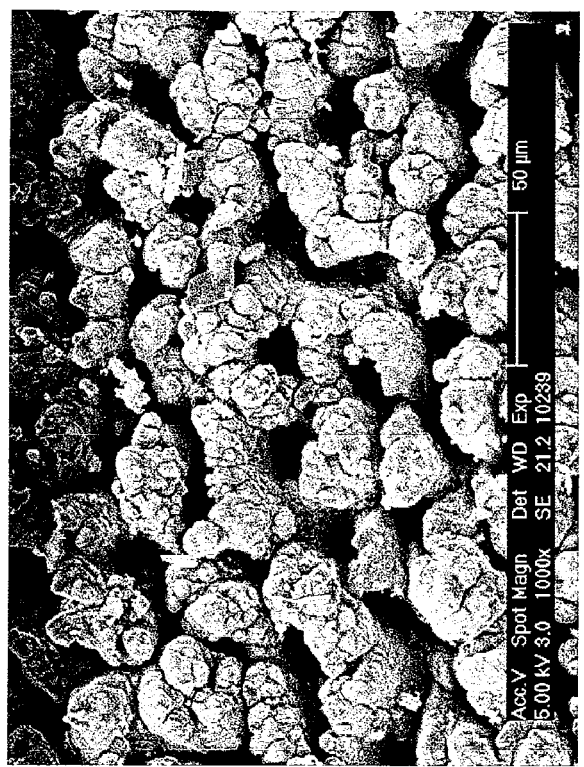

FIG. 14a shows a SEM image of an aluminum surface machined with single pulses.

FIG. 14b shows a SEM image of an aluminum surface machined with a dual pulse dual focus arrangement.

DETAILED DESCRIPTION

A problem which occurs in micro or nano-scale laser machining of materials is that dislodged particles accumulate on surfaces of said materials and, to avoid untoward effects caused by there presence, must be removed. The U.S. Pat. No. 6,337,479 to Kley, identified one method of doing so is to sweep such particles away using a scanning probe microscope probe. It would be preferable, however, if the problem could be avoided, rather than solved after it occurs. In that light the presently disclosed invention teaches that laser energy should be applied via the scanning probe microscope probe and that said probe can be agitated with ultrasonic energy to aid with prevention and/or removal of dislodged particles during material scribing or machining.

Figure 1:
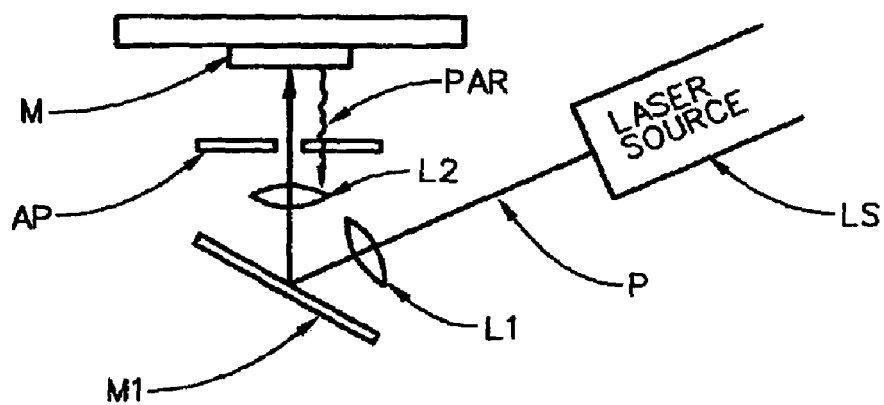
FIG. 1 shows a system useful in practice of an embodiment of the disclosed invention in which a surface of a material (M)

Turning now to FIG. 1, there is shown a system useful in practice of an embodiment of the invention disclosed in the Parent 533 application. Shown are a Laser System (LS) which is capable of producing short pulses, (eg. nano or femto or atto second length), and a Material (M) to be processed. Note that a surface of said material (M) is oriented to face downward. In use the Laser System (LS) is shown to cause pulses to approach the surface of said Material (M) from beneath. It should be readily apparent that dislodged Particles (PAR) removed from said downward facing surface of said Material (M) will fall away under the influence of gravity. Note that Mirror (M1) is used to direct the laser pulses.

FIG. 2a demonstrates a system for producing a sequence of two Laser Pulses which is useful in practicing the disclosed invention. Shown is a Beam Splitter (BS) into which is introduced a Laser Pulse. Two laser Pulses (P1) and (P2) emerge, one of which is subjected to a Time Delay (.DELTA.T), before the two Laser Pulses passed through a Beam Combiner (BC). A single Laser Pulse then emerges as two concatenated lower intensity Laser Pulses separated in Time, which sequence of pulses is passed to the Mirror (M2) for directing to the Material (M). It is to be understood that the Time Delay (.DELTA.T) introducing means can be located as shown, or between the Beam Splitter and first Mirror Means (M1) or between the Second Mirror Means (M2) and the Beam Combiner Means (BC), (ie. in any functional location).

FIG. 2b shows a system for presenting Laser Pulses (PX) and (PY) to different sides of a Material (M). Said Laser Pulses (PX) and (PY) can be applied to Material (M) simultaneously or one thereof after a Time Delay, perhaps via a FIG. 2a type Beam Splitter (BS). Note that the sequence of Mirror Means (M1), (M2) and (M3) serve to direct one of the Laser Pulses (PY). Further, two pulses (Px) (Py) can be formed by a beam splitter, and both be directed to impinge upon a single surface of a Sample. It is also noted FIG. 4 indicates that the presently disclosed invention can provide that a single Laser Pulse (PX) or (PY), (or both which is not shown), can be applied to a substantially vertically oriented Material (M) Surface so that dislodged particles (PAR) fall away under the influence of gravity. Any orientation between a downward facing surface and a laterally facing surface is within the scope of the presently disclosed invention, if gravity influences dislodged particles (PAR) to fall away from a machined surface.

While FIGS. 2a and 2b are applicable to use in the presently disclosed invention, FIG. 3 most directly demonstrates the system thereof. Shown are a Material (M), the lower Surface of which is to be scribed or machined, an Element (ESP) comprising a Shape Point, and Laser Pulses (P), indicated as being configurable to approach said Element (ESP) along any functional loci. The purpose being to free electrons in said Element (ESP) to the end that an Electric Field (EF) is formed where the Sharp Point of said Element (ESP) is in close proximity to, or in contact with, said Element (ESP), and scribing or machining of said Element (ESP) takes place as a result. Note that the upward Laser Pulse loci is identified as (PSPR) to indicate that at an appropriate angle it can excite a Surface Plasmon which travels toward the Sharp Point. (It is noted that for this to occur, the Real Part of the Dielectric Function of the material from which the Element (ESP) is made must be negative). It is to be understood that the entire FIG. 3 can be rotated so that the Material (M) Surface to be scribed or machined faces horizontally as in FIG. 4, or even upward as indicted in FIG. 5, (for the case where liquid is present to remove particles), Laser Pulses (P) (PSPR) and remain within the scope of the present invention. Of course benefit results when said Material (M) Surface is oriented as shown, or is rotated less than about ninety (90) degrees clockwise because gravity then aids particle removal. The new matter being that the Laser Pulses (P) are directed at the Element (ESP), rather than directly at the Surface of the Material (M). Note also the element (UL). Said element can be an arm of a Scanning Probe or Atomic Force Microscope, or means for providing Ultrasonic Agitation to the Element comprising the Sharp Point (ESP). Ultrasonic agitation aids with elimination of particles which accumulate thereon. It is also to be understood that any of the beam directing and pulse delay entry means etc. shown in FIGS. 1, 2a, 2b and 4, and Pulse delivery through fluid shown in FIG. 5 can be adapted for use with the FIG. 3 system.

FIG. 5 is included to indicate that a surface of a Material (M) can be subjected to Laser Pulses through a fluid (LIQ), and dislodged particles removed thereinto even when the material surface is oriented to face upward. Said Liquid (LIQ) can be made to flow, but it has not been necessary in some experiments to require a flow thereof to disperse dislodged particles (PAR) from the surface. It has also been found that applying Laser Pulses through a fluid in which a Material (M) is submerged helps prevent Brittle Materials from breaking. Fluids useful include air, nitrogen gas, water, acetone, methonal, ethanol, trichloroethlyne etc. Again, the system of FIG. 5 can be adapted to for use with the system of FIG. 3.

Results From Practice of Parent Application Methodology

The following results are presented for background, and were achieved by applying femto second or shorter laser pulses directly to a material. (Note, the presently disclosed invention need not provide short pulses to achieve comparable results).

EXAMPLE 1

To demonstrate the utility enabled by practice of the disclosed invention, P-type (111) Silicon with a resistivity of 8 m-ohm-cm was processed by various combinations of laser pulse width, repetition rate, total number of pulses and power per pulse etc., to the end that holes with a diameter on the order of a micron to a few microns, and a depth to width aspect ratio of up to about 8, were achieved. Diameter, (both inside and outside surface rim), and Depth Results were documented both in the case wherein no effort was made to prevent dislodged debris from accumulating on the Silicon being processed, and wherein effort was made to prevent said dislodged debris accumulation during Silicon processing, and it is noted at this point that where dislodged debris was not allowed to accumulate on the processed Silicon, superior results were achieved.

A regenerative laser amplifier system based on chirped pulse amplification was applied to provide low energy pulses from a mode-locked Ti:sapphire oscillator, Spectrea-Physics Tsunami. The oscillator was pumped by a Spectra-Physics Millennia V, diode pumped visible cw laser. The oscillator beam was passed through a faraday isolator, manufactured by EOT, and sent into the regenerative amplifier system. A Photonics Industries Model TRA-50-2 system was pumped by an intra-cavity frequency doubled, q-switched Nd:YLF Laser, Photonics Industries Model GM-30. Said system can typically output 150 fs pulses at one-kiloherts, with a maximum energy of 800 micro-joules per pulse. The laser provided a nominal wavelength of 795 nm which can be frequency doubled to 397 nm using a Casix 1 mm thick Barium Borate (BBO) crystal.

The output beam was frequency doubled utilizing a BBO crystal and sent through neutral density filters to attenuate the power to a range suitable to the materials being processed. The final output power was set with a half-wave plate, CVI part QWPO-400-05-2-R10, and a Glan Laser Polarizer, Melles Griot Part 03PGL303 and the beam was directed utilizing dichroic mirrors, CVI Part No. LWP-45-R400-T800-PW-1025-UV. Filtering was performed to block any residual 795 nm wavelength content. An Optics Research Objective Lens, Part No. LMU-15x-NUV was then used to focus the beam. This lens system was selected as it provides a magnification of 15 times and a working distance of 11 nm. The long focal length helps to prevent dislodged debris from accumulating thereupon in use.

It is noted that sample positioning was performed using Melles Griot Nanomotion II Translation Stages, with X and Y axes controlled with Melles Griot Model 11NCM001, and with the Z axis controlled by Melles Griot Model 11NCM005 Controllers. A color CCD Camera, Topica TP-8001A was used to facilitate alignment and viewing in real-time. A Dolan Jenner Fiber-Lite Model 180 was used to provide illumination.

It is further noted that a Clark MXR fs Autocorrelator was used to measure pulse length and a Newport Model 835 Power Meter tuned to 400 nm wavelength, was used to measure the laser power. Measurements were taken while the laser was running at 1019 HZ and then energy per pulse was calculated. Post processing was performed using a Digital Instruments nanoscope II, Atomic Force Microscope (AFM). In addition, post damage analysis was performed by Advanced Micro Devices. Scanning Electron Microscope (SEM) images were taken of the top surface and a profile of the holes created, after the substrate was machined away with a focused ion beam, and then the holes were imaged at a 45 degree angle. The results of the described work are presented in Table 1. (Note that "Inner Diameter" indicates the Targets width of the laser machined hole inside a rim build-up around said hole).

TABLE 1

| Pulses | Energy (nJ) | Inner Diameter (n) | Depth (n) | Aspect Ratio |
|---|---|---|---|---|
| 10 | 14.7 | 1.38 | 0.59 | 0.43 |
| 10 | 29.4 | 1.72 | | |
| 10 | 39.3 | 1.75 | 1.03 | 0.59 |
| 10 | 49.1 | 1.87 | | |
| 100 | 4.91 | 1.13 | | |
| 100 | 14.7 | 1.49 | 3.65 | 2.45 |
| 100 | 19.6 | 1.6 | | |
| 100 | 29.4 | 1.96 | | |
| 100 | 44.2 | 1.98 | >10.2 | 5.15 |
| 1000 | 9.81 | 1.47 | >6.31 | 4.29 |
| 1000 | 14.7 | 1.71 | >10.4 | >6.08 |
| 1000 | 24.5 | 1.84 | | |
| 1000 | 34.3 | 2.13 | | |
| 1000 | 44.2 | 2.2 | >14.8 | >6.73 |
| 1000 | 49.1 | 2.18 | >15.3 | >6.48 |
| 2000 | 4.91 | 1.24 | | |
| 2000 | 9.81 | 1.49 | | |
| 2000 | 14.7 | 1.64 | | |
| 2000 | 19.6 | 1.80 | | |
| 2000 | 24.5 | 2.04 | | |
| 2000 | 29.4 | 2.11 | | |
| 2000 | 34.3 | 2.09 | | |
| 2000 | 39.3 | 2.15 | >15.8 | >7.35 |
| 2000 | 44.2 | 2.22 | >16.7 | >7.52 |
| 2000 | 49.1 | 2.18 | | |

FIG. 6 shows a plot of Diameter vs. Energy(nJ) of laser pulse effected holes in P-type (111) Silicon with a Festivity of 8 m-ohm-cm, and FIG. 7 shows a plot of Depth vs. Energy(nJ) of laser pulse effected holes in P-type (111) Silicon with a Festivity of 8 m-ohm-cm. Also shown in FIG. 6 is a regression fit based upon an equation: $D = SQRT(1\, nE)$ provided by Linde and Schyler in an Article titled "Breakdown Threshold and Plasma Formation in Femtosecond Laser-Solid Interaction", J. of the Opt. Soc. of America B., Opt. Phys. 13(1), pp 216-222 (1996). FIGS. 6 and 7 show results obtained from practice of the methodology disclosed in Parent application Ser. No. 10/347,533 in which laser pulses are directly applied to a Material Surface.

EXAMPLE 2

Results of the foregoing work made it evident that creation of laser machined high Aspect ratio holes in the (111) P-type Silicon which is present substantially motionless air, is accompanied by the unwanted side effect of nano scale particles building-up around the opening, thus creating a "rim" around said hole. The use of gas-flow and of a vacuum stream were investigated to determine is said adverse "rim" build-up effect could be reduced. In this work the laser set-up was similar to that previously disclosed, but the laser was operated at 795 nm wavelength and at a repetition frequency of 996 Hz. The final output level was set with a half wave-plate, CVI Part QWPO-800-05-2-R10, and a Glans Laser Polarizer, Melles Griot Part 03PGL303. The beam was directed with dichroic mirrors, CVI Part TLMI-800.0-1037 and is again focused by Optics Research Part No. LMU-15x-NUV. Because the focusing lens is optimized around 400 nm, power readings were taken before the lens with Newport Power Meter Model 835 and after the lens with Newport Power Meter Model 1815-C.

Laser pulses were applied while a gas was caused to flow from a short length of quarter inch stainless steel tubing through an apertures opening of 7.35 mm by 0.64 mm. Gas flow to and from the nozzle was monitored by Cole-Parmer FM044-40 flow rate sensor. Compressed nitrogen was used to form a jet stream and an Air Dimensions Model 01310TCQ Vacuum Pump was used to create a vacuum stream. Gas flow was directed parallel to the surface of the (111) P-type Silicon, which was held stationary by use of Ted Pella Colloidal Graphite Paint.

Table 2 gives the Power levels before and after objective lens with corresponding pulse energy:

TABLE 2

| Power Before Lens (W) | Power After Lens (W) | Energy (nJ) |
| --- | --- | --- |
| 60.0 | 38.9 | 39.1 |
| 70.0 | 46.1 | 46.3 |
| 80.0 | 52.3 | 52.5 |
| 90.0 | 59.3 | 59.5 |
| 100.0 | 65.8 | 66.1 |

Before the experiment the laser pulse length was measured using a Clark MXR fs Autocorrelator, which resulted in a pulse length of 180 fs being measured. The material used was (100) P-type Silicon with 8 m-ohm-cm resistivity. All results were obtained on the same day to ensure identical laser parameters. After cleaning with methanol to remove unattached particles, post damage analysis was performed in-house with a Phillips XL30ESEM Environmental Scanning Electron Microscope (ESEM) to determine deposited suffice debris. Three samples were processed. One Control sample was just left out in the atmosphere. A second was laser machined while a flow of nitrogen was caused at the laser focal point. The third sample was laser machined while a small vacuum pump caused an intake stream near the damage area. For each the laser was exposed for various times corresponding to a certain number of pulses, as listed in Table 3:

TABLE 3

| Exposure Time and Pulse Count | |
| --- | --- |
| Time (Sec) | Pulses |
| 0.1 | 100 |
| 0.2 | 199 |
| 0.5 | 498 |
| 1.0 | 996 |
| 2.0 | 1992 |
| 5.0 | 4980 |

The control sample was processed at the energy levels listed in Table 2. FIG. 8 shows results obtained from practice of the methodology disclosed in Parent application Ser. No. 10/347,533 in which laser pulses are directly applied to a Material Surface. Shown are damage diameters for various laser energies and exposure times. Note that the damage diameter has a slowly increasing trend up until the exposure time is one or two seconds. For longer exposure times the extra pulses cause a greater widening of the surface damage diameter than would be extrapolated from shorter exposure times.

FIGS. 9a and 9b show SEM photos of holes created in (100) P-type Silicon with 8 m-ohm-cm resistivity by 0.1 second exposure to laser pulses, without and with application of a gas jet, respectively. Note the sharper edge in FIG. 9b. Again, said results were obtained using methodology disclosed in Parent application Ser. No. 10/347,533 in which laser pulses are directly applied to a Material Surface. Said results are included for reference and to provide continuity with the Patent 533 application.

To give insight to the flow rates utilized to achieve results as shown in FIG. 9b, Tables 4 and 5 relate Nitrogen Gas, and Vacuum caused Flow Rates as they are corelated to Nozzle velocities.

TABLE 4

| Nitrogen Flow | |
| --- | --- |
| Flow Rate (l/min) | Nozzle Velocity (m/sec) |
| 13.9 | 49.2 |
| 24.1 | 85.5 |
| 31.1 | 110.0 |
| 41.5 | 147.0 |
| 53.3 | 189.0 |

TABLE 5

| Vacuum Stream Flow | |
| --- | --- |
| Flow Rate (l/min) | Nozzle Velocity (m/sec) |
| 5.43 | 19.3 |
| 10.4 | 36.9 |
| 15.3 | 54.3 |

From the foregoing it is evident that both gas jet and vacuum stream greatly reduce the debris deposited on the surface of a (100) P-type Silicon with 8 m-ohm-cm resistivity substrate.

It is to be specifically understood that the terminology "fluid" encompasses both liquid and gas.

It is also to be understood that while scribing materials, such as semiconductor substrates, to facilitate separating of individual devices in a substrate can be considered to constitute machining of said materials. Scribing is specifically mentioned as it is an important application of the disclosed invention.

It is also specifically noted that in one aspect, Patentability of the disclosed invention is believed found in systems and methodology of their use which apply laser beam pulses to elements which comprise sharp points which are placed in close proximity to, or in contact with a surface of a material which is to be scribed or machined. Additional considerations include enabling gravity and/or material submerging fluid to remove particles dislodged from a laser scribed or machined surface of a material, in order to avoid untoward effects of their presence during further scribing or machining thereof. Additional attributes of the disclosed invention serve to optionally provide means and methodology for producing a sequence of short duration laser pulses from a single pulse, and for enabling simultaneous scribing or machining of two surfaces of a material, or two positions on a single surface thereof.

Finally, it is further specifically noted that FIGS. 6-9b show results for applying short (eg. femto second or shorter), laser beam pulses to directly scribe or machine materials. As the presently disclosed invention applies laser provided energy via a sharp point, is not limited to use of said short pulses, but can achieve similar or even better results. Any functional laser beam pulse length and repetition cycle which serves to free electrons in the element comprising said sharp point upon which the laser is focused, can be utilized. Further, the sharp point can be oriented in any direction, it need not approach a material surface from below for the technique to work, although such a configuration still provides particle removal benefits.

An alternate embodiment of the present invention is shown in FIGS. 10-14b. In this alternate embodiment of the present invention, an apparatus for and method of removing material from an object using a collinear dual beam, dual pulse laser is disclosed. The present invention provides a way to machine or scribe a surface such that surface smoothness is significantly improved over prior art techniques using a laser. To accomplish this, a single laser pulse is split into two beams with the beams having different focal lengths such one beam contacts the surface to be machined or scribed, while another beam focuses on a point a distance away from the surface so as to create a shockwave that passes over the machined or scribed surface and smoothes surface imperfections left by the one beam.

Referring to FIG. 10, the apparatus 100 associated with generating collinear dual beams having dual pulses includes a laser source (LS) capable of producing short pulses 102 (e.g. nano, femto, or atto second length), a first mirror (M1) capable of reflecting the laser pulse 102 produced by the laser source, and a first variable beam splitter 104. The first variable beam splitter 104 is designed to divide the single laser pulse 102 into two beams and is variable in the sense that a user can select and modify, as desired, the percentage of the laser pulse 102 that forms each of the beams. The pulse 102 can be split to form two evenly sized beams or one beam may be larger than the other beam.

The apparatus 100 further comprises a first plurality of mirrors 106 capable of receiving and reflecting a first beam 108 through a first focal length lens 110. The exact length of the first focal length lens 110 can vary. The first focal length lens 110 is also depicted in FIG. 11a. For an embodiment of the present invention, one acceptable focal length for the first focal length lens 110 is 5000 mm. By adjusting the length of the first focal length lens 110, the focal point 108a associated with the first beam 108 can change.

The first plurality of mirrors 106 are set to establish a path length for the first beam 108 to travel. However, in an embodiment of the present invention, this focal length can be variable. In order to vary the path length, one or more of the mirrors 106 can translate so as to alter the distance between the mirrors 106. As a result, any translation of the mirrors 106 causes a change in the arrival time of the first beam 108 to its focal point 108a.

The apparatus 100 also has a second plurality of mirrors 112 similar to the first plurality of mirrors 106, but for reflecting a second beam 114 from the first variable beam splitter 104. For the embodiment of the present invention depicted in FIG. 10, the second plurality of mirrors 112 constitutes two mirrors, whereas the first plurality of mirrors 106 constitutes four mirrors. The exact number of mirrors can vary depending on the laser set-up and machining or scribing requirements.

Referring to FIGS. 10 and 11a, the apparatus 100 further comprises a second variable beam splitter 116 capable of receiving the first beam 108 from the first plurality of mirrors 106 and the second beam 114 from the second plurality of mirrors 112. The beams 108 and 114 pass to a second mirror M2 that is capable of reflecting the first beam 108 and the second beam 114 from the second variable splitter 116.

The apparatus 100 also includes a second focal length lens 118. As with the first focal length lens 110, the size of the second focal length lens 118 can also vary. One such acceptable size for the second focal length lens 118 is approximately 100 mm.

The first beam 108 and the second beam 114 each pass through the second focal length lens 118 such that one of the first or second beams contact one or more surfaces 120, while one of the first or second beams is focused a distance X from the one or more surfaces 120 (see FIG. 11a). For one embodiment of the present invention, utilizing a 5000 mm focal length lens as the first focal length lens 110 and a 100 mm focal length lens as the second focal length lens 118, the distance X between the beams respective focal points 108a and 114a is approximately 2 mm. However, if the 5000 mm focal length lens is reduced by half, the distance X, for a given second focal length lens 118, is also reduced by half.

As previously discussed, one such way to alter this distance X is to change the focal length of the first focal length lens 110 and/or the second focal length lens 118. If the first focal length lens is varied for a given second focal length lens, then the distance X, as measured from the second focal point 114a, changes. However, if the second focal length lens is varied for a given first focal length lens, then the distance X, as measured from the first focal point 108a, changes.

FIG. 11b depicts a chart comparing the number of photons for each of the beams as a function of time. As it can be seen from this chart there are two distinct timeframes in which large number of photons from the laser beams 108 and 114 contact the surface. This is an indication of the time-delay between the first beam 108 and the second beam 114.

In an embodiment of the present invention, a method of removing material from an object using a collinear dual beam dual pulse laser is disclosed. The method comprises providing an object 122 having one or more surfaces 120 on which laser scribing or laser machining will occur. A laser pulse producing means, such as a laser source LS, is provided through which a laser pulse 102 is directed through a shutter 124. The laser pulse 102 is reflected by a first mirror (M1) and towards a first variable beam splitter 104. The laser pulse 102 is then split into a first beam 108 and a second beam 114 by the first variable vane splitter 104. As previously discussed, the pulse can be split into two equal beams or split such that one beam is larger than the other. One example of splitting the beams such that the second beam 114 has a majority of the energy would be in the case of laser drilling a surface in which a deep hole is desired. When the second beam 114 contacts the surface 120, and is stronger than the first beam 108, the laser beam can penetrate further into the thickness of the material, thereby removing more material with a single pulse and forming a deeper hole. On the other hand, an example in which it is beneficial to have the first beam 108, that is the beam in which the focal point 108a does not contact the surface 120, have a larger portion of the energy, would be in a case where it is desirable to create a larger shockwave for smoothing the surface that is being laser scribed or machined.

The first beam 106 is directed through a first plurality of mirrors 106 and a first focal length lens 110. Meanwhile, the second beam 114 is directed through a second plurality of mirrors 112. The first beam 106 and the second beam 114 are then directed to a second variable beam splitter 116 and to a second focal length lens 118 by way of a second mirror M2.

The first beam 106 and the second beam 114 are then directed towards one or more surfaces 120 where one of the beams has focal point on the surface 120 while the other beam is focused slightly above the surface 120. As to which beam is focused on the surface 120 and which beam creates the shockwave for smoothing the surface, that depends on the size and location of the focal length lenses 110 and 118.

Depending on the desired laser scribing or machining, the method may also further comprise the step of varying the path length that either the first beam or second beam must travel. Changing the path length from a nominal setting alters the arrival time of the beam at its respective focal point.

Photographic evidence of an improvement provided by the collinear dual focus dual beam laser is shown in FIGS. 12 and 13. FIG. 12 is a photograph of laser drilled hole in a silicon surface from a single femtosecond laser pulse. The result of this single pulse process leaves a large amount of splattered residual material in an area adjacent to the hole. However, when the process outlined above is followed using the apparatus 100, as depicted in FIGS. 10 and 11a, using the same silicon material, a laser drilled hole as shown in FIG. 13 can be formed. The amount of micron and nanoparticles produced around the drilled hole is greatly reduced. Although described and depicted for a laser-drilled hole, similar results can be seen for a laser scribed surface.

Such an improved hole drilling, including the smooth surface finish, is achieved by maintaining control over the splitting of the laser pulse (percent split), the path length of the beam (which can affect arrival time of the beams and which beam arrives first), and focal length of the lens (so as to control the distance between the focal points). As an example, FIG. 14a is a microscopic-level photograph of the surface finish of aluminum machined with a single pulse laser. The result of this process is a surface that is heavily pitted. FIG. 14b is a photograph under the same magnification and scale of FIG. 14a, also of an aluminum product, but this surface is produced with the dual pulse dual focus laser described above. This photograph shows a much smoother surface.

The process outlined above can also be used when performing femtosecond laser induced breakdown spectroscopy (FLIBS). The FLIBS signal is enhanced due to the interaction of the second beam with electrons, ions, and nanoparticles ejected from the first beam. The first beam essentially forms a plasma mirror and enhances a return signal to a detector.

As with the alternate embodiments of the invention previously described above, embodiments related to the collinear dual focus dual beam pulse laser for scribing or machining can also be used such that the scribing or machining is competed in an inverted manner with the laser oriented along an upward locus.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

The invention claimed is:

1. An apparatus for removing material from a surface of an object, the apparatus comprising:
  a laser pulse producing means;
  a first mirror capable of reflecting a laser pulse produced by the laser pulse producing means;
  a first variable beam splitter;
  a first plurality of mirrors capable of receiving and reflecting a first beam through a first focal length lens;
  a second plurality of mirrors capable of receiving and reflecting a second beam;
  a second variable beam splitter capable of receiving the first beam from the first plurality of mirrors and the second beam from the second plurality of mirrors;
  a second mirror capable of reflecting the first and second beams from the second variable beam splitter; and
  a second focal length lens;
  wherein the first and second beams each pass through the second focal length lens such that one of the first or second beams contacts a portion of the surface of the object thereby removing material from the surface of the object and the other of the first or second beams has a focal point at a location outside the object at a distance from the surface so as to create a shockwave that passes over the portion of the surface of the object from which material is removed.

2. The apparatus of claim 1, wherein the first variable beam splitter is capable of splitting the laser pulse into the first and second beams.

3. The apparatus of claim 1, wherein the first plurality of mirrors outnumbers the second plurality of mirrors.

4. The apparatus of claim 1, wherein the first focal length lens can vary relative to the second focal length lens.

5. The apparatus of claim 4, wherein the distance between the focal points varies with respect to the first and second focal length lenses.

6. The apparatus of claim 1, further comprising a translating means that changes a path length for one or more of the first or second beams so as to impart a delay in an arrival time of the first or second beam.

7. The apparatus of claim 1, wherein the first and second beams approach the surface from beneath, along an upward oriented locus.

8. The apparatus of claim 1, wherein said one of the first or second beams that contacts a portion of the surface of the object thereby removing material from the surface of the object has a focal point at a location on the surface of the object.

* * * * *